(No Model.)

W. W. GRIER.
VEHICLE.

No. 251,043. Patented Dec. 20, 1881.

Witnesses.
Jno K Smith
Jas. A Carlin

Inventor
William W. Grier
by his attorneys
Bakewell & Kerr

United States Patent Office.

WILLIAM W. GRIER, OF HULTON, PENNSYLVANIA.

VEHICLE.

SPECIFICATION forming part of Letters Patent No. 251,043, dated December 20, 1881.

Application filed June 24, 1881. (No model.)

*To all whom it may concern:*

Be it known that I, WILLIAM W. GRIER, of Hulton, in the county of Allegheny and State of Pennsylvania, have invented a new and useful Improvement in Vehicles; and I do hereby declare the following to be a full, clear, and exact description thereof.

My invention relates particularly to the construction of sewing-machine and similar wagons in which the seat is placed well forward in the body, so as to have the greater part of the body back of the seat, in order to provide space for the machine or other article which constitutes that part of the load. The result of this construction is that usually the heavier part of the load is at the extreme front of the body. This has a tendency to throw up the rear end of the body and to give it a jerky, bouncing, and unsteady motion, which is not only unpleasant, but necessitates the careful fastening of the load in the wagon.

My invention consists in obviating this by the use of a curved supplemental or tie spring or springs extending from the rear axle and fastened to the rear end of the body.

To enable others skilled in the art to understand my invention, I will now describe it by reference to the accompanying drawings, in which—

Figure 1:
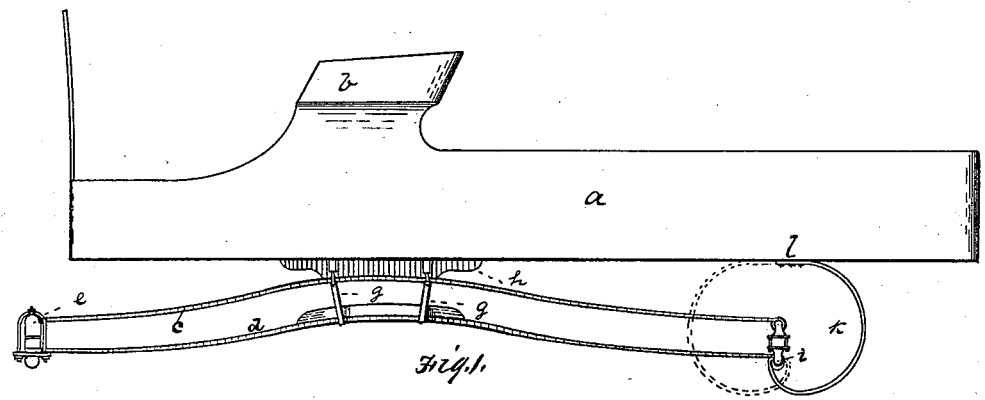
Figure 2:
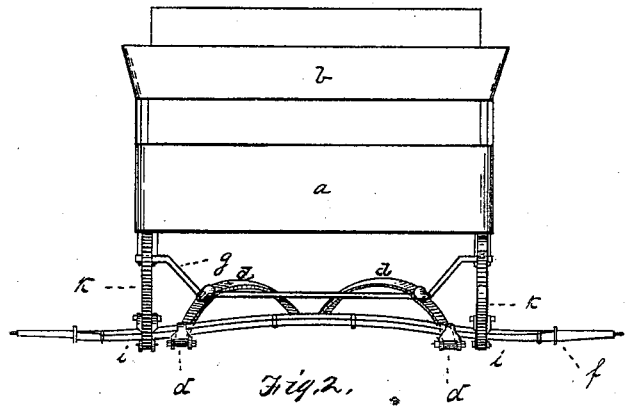

Figure 1 is a side view of the body, springs, and axles of a side-spring vehicle; and Fig. 2 is a rear view of the same.

Like letters of reference indicate like parts in each.

The body $a$ has its seat $b$ near the forward end, and thereby gives a large space at the rear end for the load. The body is mounted on a spring-gear composed of two side springs, $c$, and two diagonal springs, $d$, the springs being attached at the ends to the head-block $e$ in front and to the rear axle, $f$, behind, and united near the middle by the cross-braces $g$. The body $a$ rests on the blocks $h$, which are fastened to the springs $c$.

Fastened to the rear axle, $f$, in any suitable way and at any convenient or desirable point, $i$, is a C spring or springs, $k$, the other end of which is bolted or otherwise attached to the body at $l$. This spring may be applied as shown either in the full or dotted lines, Fig. 1. Its effect is to tie down, steady, and control the motion of the rear end of the body, and to counteract or prevent the jerky motion mentioned as occurring when the load is thrown on the forward part of the bed, rendering the use of the wagon much more pleasant and reducing wear and tear. It also serves to supplement the bearing-springs when the load is placed back of the transverse center.

Another advantage of my invention is that in case the load placed in the back end of the body is heavy the C spring or springs aid to sustain and relieve to that extent the other springs of the weight.

I have described my invention in connection with a side-spring vehicle, but it is also applicable to transverse-spring vehicles. I have mentioned it as particularly applicable to sewing-machine and similar wagons; but I do not limit it to such, as it is of use in any construction of light wagons.

What I claim as my invention, and desire to secure by Letters Patent, is—

1. In a spring-vehicle, the combination, with a bed or body having the seat arranged forward of the transverse center, and with the rear axle, of one or more supplemental or tie springs of general C form, which connect the rear axle and body, substantially as and for the purpose specified.

2. The combination, with the bed or body having the seat thereon arranged forward of the transverse center, and with the rear axle, of a series of lateral or side springs, and one or more supplemental C-springs, which connect the rear axle and bed, substantially as and for the purpose specified.

In testimony whereof I have hereunto set my hand.

WILLIAM W. GRIER.

Witnesses:
T. B. KERR,
JAMES H. PORTE.